Oct. 28, 1924.
E. BUCHANAN
BUMPER OPERATED BRAKE
Filed Jan. 15, 1924
1,513,483
2 Sheets-Sheet 1
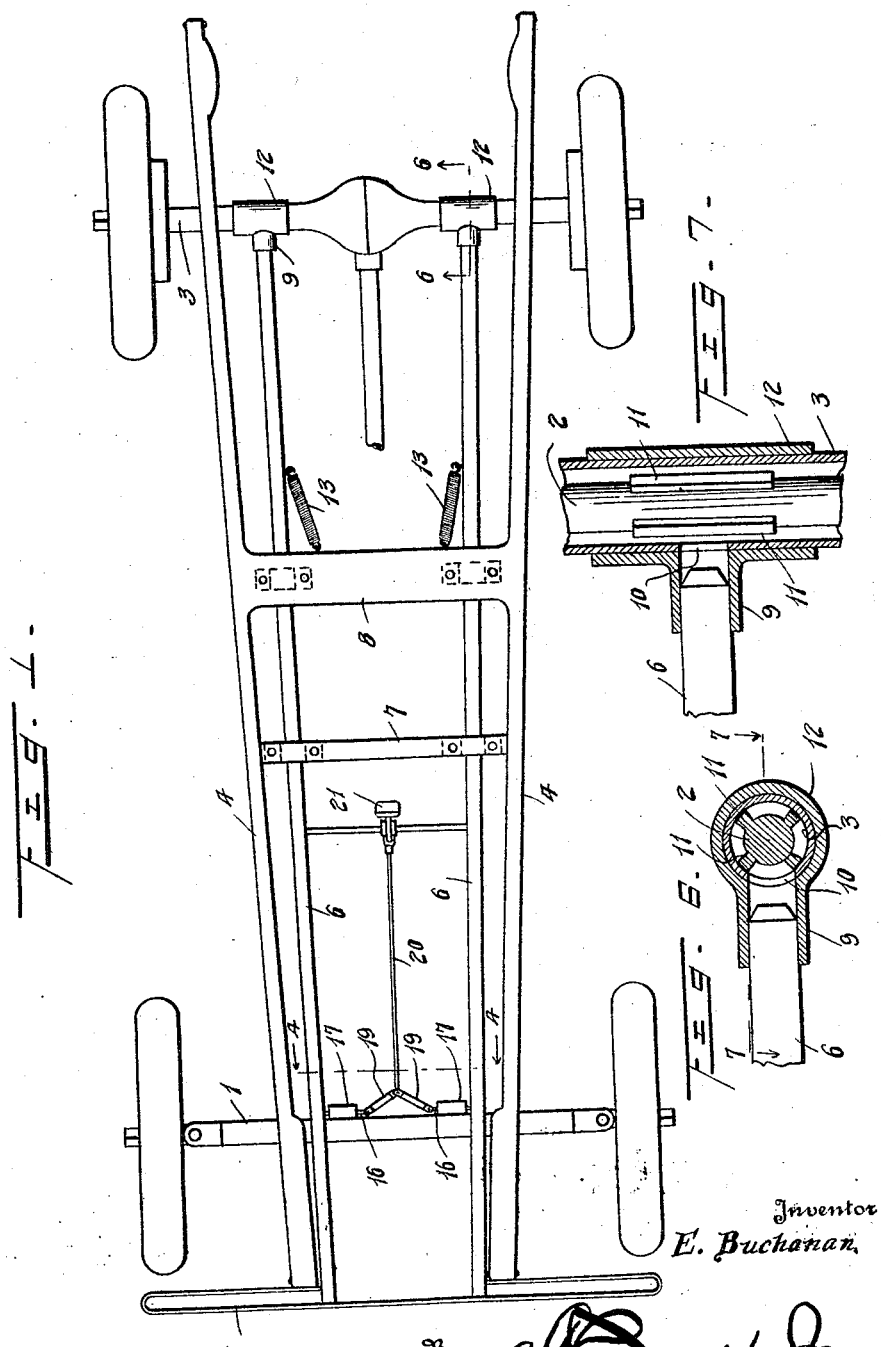
Inventor
E. Buchanan,
By
Attorney Oct. 28, 1924.
E. BUCHANAN
1,513,483
BUMPER OPERATED BRAKE
Filed Jan. 15, 1924  2 Sheets-Sheet 2
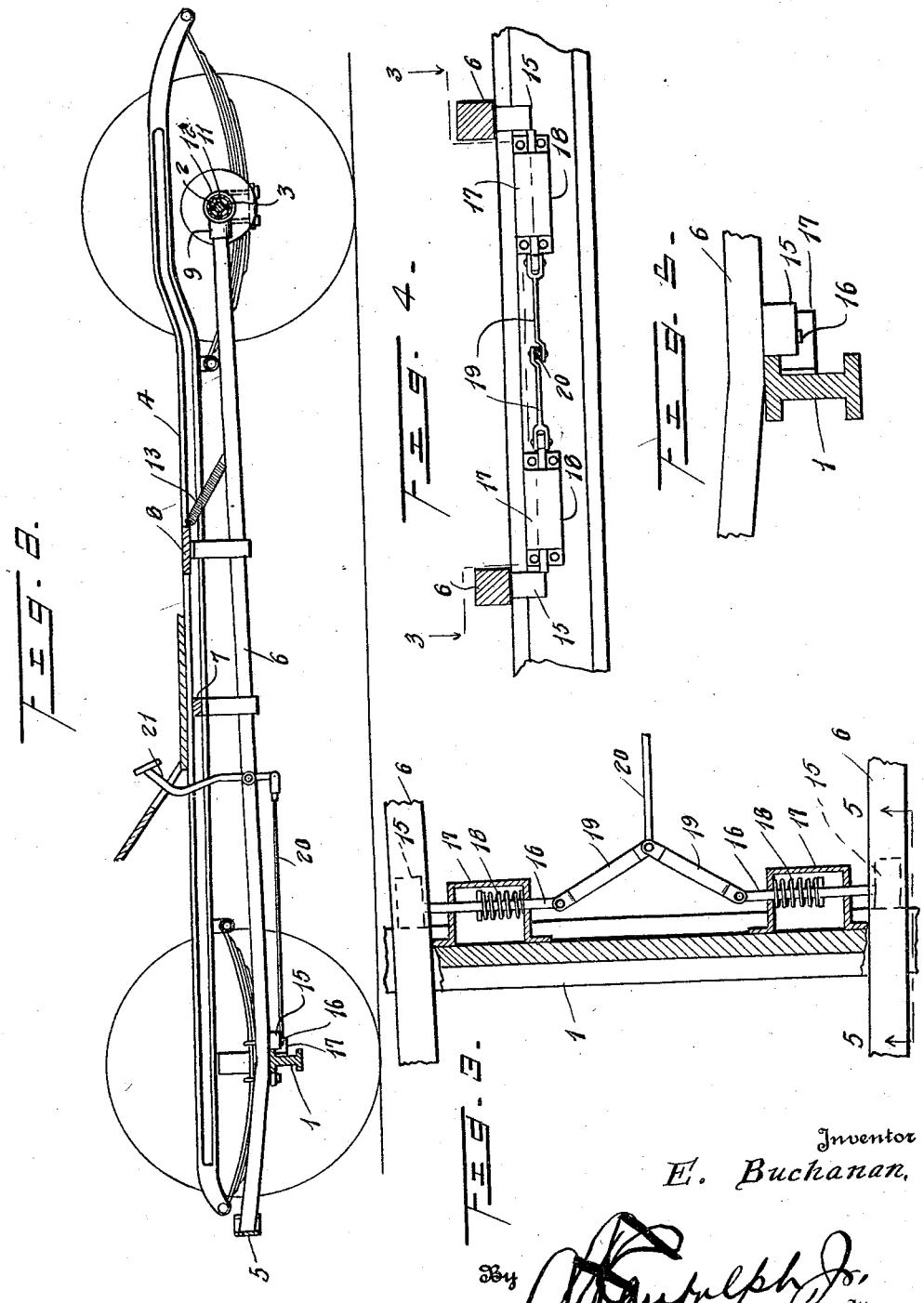
Inventor
E. Buchanan.

Patented Oct. 28, 1924.

1,513,483

UNITED STATES PATENT OFFICE.

EUGENE BUCHANAN, OF FALL RIVER, MASSACHUSETTS.

BUMPER-OPERATED BRAKE.

Application filed January 15, 1924. Serial No. 686,362.

*To all whom it may concern:*

Be it known that I, EUGENE BUCHANAN, a citizen of the United States, residing at Fall River, in the county of Bristol and State of Massachusetts, have invented certain new and useful Improvements in Bumper-Operated Brakes; and I do hereby declare the following to be a full, clear, and exact description of the invention, such as will enable others skilled in the art to which it appertains to make and use the same.

The invention relates to brake mechanism for vehicles and more particularly to a bumper-actuated brake for automobiles and motor vehicles generally, whereby in the event of the bumper striking an object the brake is automatically applied and held set until released by the driver.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view of the chassis of a motor vehicle provided with a bumper-operated brake mechanism embodying the invention, Figure 2 is a side view of the parts shown in Figure 1, Figure 3 is a sectional detail view showing more clearly the means for holding the brake set when applied, the same being taken on the line 3—3 of Figure 4, Figure 4 is an enlarged sectional detail on the line 4—4 of Figure 1, looking in the direction of the arrows, Figure 5 is a detail sectional view on the line 5—5 of Figure 3, looking in the direction of the arrows, Figure 6 is an enlarged detail sectional view on the line 6—6 of Figure 1, and Figure 7 is a sectional view on the line 7—7 of Figure 6.

Corresponding and like parts are referred to in the following description and designated in the several views of the drawings by like reference characters.

The numeral 1 designates the front axle, 2 the rear axle, 3 the rear axle housing, 4 the side bars of the chassis and 5 the bumper which are well known parts of a motor vehicle and which are illustrated to demonstrate the application of the invention.

Longitudinal bars 6 are connected at their forward ends to the front member of the bumper 5 and rest upon the front axle 1 and pass through keepers applied to cross-bars 7 and 8 connecting the longitudinal bars 4. The elements 6 constitute brake bars and are mounted to receive a longitudinal movement and their rear ends co-operate with guides 9 applied to the rear axle housing 3. Openings 10 are formed in the rear axle housing 3 in line with the guides 9 and the rear ends of the brake bars 6 are adapted to pass therethrough and engage projections 11 at the sides of the axle 2. Sleeves 12 fitted upon the rear axle housing carry the guides 9 and the latter snugly receives the rear ends of the brake bars 6, thereby preventing dust or foreign matter entering the axle housing or lubricant escaping from the latter. Helical springs 13 normally hold the brake bars 6 projected forwardly and clear of the projections 11 of the rear axle.

Projections 15 at the bottom side of the brake bars 6 are adapted to be engaged by lock bolts 16 whereby to hold the brake bars when moved rearwardly into engagement with the projections 11 of the rear axle 2. A casing 17 is provided for each of the lock bolts 16 and is attached to the front axle 1 and contains a spring 18 which normally urges the lock bolt outwardly so as to extend in front of the projection 15 and hold the brake bar 6 when moved rearwardly into engagement with the projections 11 of the rear axle 2. Links 19 connect the inner ends of the lock bolts 16 with a rod or bar 20 which is connected to a foot lever 21. When the foot lever 21 is operated, the lock bolts 16 are drawn inwardly out of the path of the projections 15, thereby admitting of the springs 13 moving the brake bars 6 forwardly so as to clear the projections of the rear axle.

What is claimed is:

1. A vehicle brake comprising in combination with a vehicle including an axle and a housing having an opening therein, a longitudinally movable brake bar adapted to enter said opening, and a projection upon the axle to coact with said brake bar whereby to lock the axle against rotation.

2. A vehicle brake comprising in combination with a vehicle including an axle and a housing having an opening therein, a tubular guide communicating with said opening, a longitudinally movable bar adapted to be operated by impact with an object, mounted in said tubular guide, and adapted to engage the axle of the vehicle and hold it against movement.

3. A vehicle brake comprising in combination with a vehicle including an axle and a housing having an opening therein, a tubular guide communicating with said opening, a longitudinally movable bar adapted to be operated by impact with an object, mounted in said tubular guide and adapted to engage the axle of the vehicle and hold it against movement, a spring normally urging the brake bar forwardly, and a locking device adapted to coact with the brake bar to hold the same in locking engagement with the axle when moved rearwardly by impact.

4. In a vehicle provided with a bumper, a rotating axle and a housing for said axle having an opening therein, a tubular guide, communicating with said opening, a longitudinally movable bar in cooperative relation with the bumper, mounted in said tubular guide and adapted when moved rearwardly to engage the axle and prevent rotation thereof.

5. In a vehicle provided with a bumper and a rotating axle, a longitudinally movable bar in cooperative relation with the bumper and adapted when moved rearwardly to engage the axle and prevent rotation thereof, a spring normally urging the brake bar forwardly, a locking device to hold the brake bar when moved rearwardly into locking engagement with the axle, and manually operable means for effecting release of the brake bar.

6. In a motor vehicle provided with a bumper, longitudinally disposed brake bars in cooperative relation with the bumper and adapted to be moved thereby into locking engagement with the axle, spring means normally urging the brake bars forwardly, lock bolts for holding the brake bars when moved rearwardly into locking engagement with the axle, and a lever for effecting release of the brake bars from the lock bolts.

In testimony whereof I affix my signature in presence of two witnesses.

EUGENE BUCHANAN.

Witnesses:
 JOSEPH HAYES,
 JAMES R. THORNLEY.